(12) United States Patent
Abe

(10) Patent No.: US 6,611,508 B1
(45) Date of Patent: Aug. 26, 2003

(54) WIRELESS COMMUNICATION METHOD AND APPARATUS WITH POWER-CONTROL CHANNEL

(75) Inventor: Masami Abe, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/181,750

(22) Filed: Oct. 29, 1998

(30) Foreign Application Priority Data

Nov. 12, 1997 (JP) .............................................. 9-310607

(51) Int. Cl.[7] ................................................. H04Q 7/00
(52) U.S. Cl. ........................ 370/332; 370/342; 370/441; 455/69; 455/70; 455/88; 455/522
(58) Field of Search ........................ 370/318, 332–333, 370/320, 342, 441; 455/522, 69–70, 88; 375/130

(56) References Cited

U.S. PATENT DOCUMENTS

| | | | | |
|---|---|---|---|---|
| 4,912,705 A | * | 3/1990 | Paneth et al. ................ | 370/334 |
| 5,715,526 A | * | 2/1998 | Weaver et al. ............... | 455/103 |
| 5,732,328 A | * | 3/1998 | Mitra et al. | |
| 5,737,327 A | * | 4/1998 | Ling et al. | |
| 5,896,376 A | * | 4/1999 | Alperovich et al. | |
| 5,933,781 A | * | 8/1999 | Willenegger et al. | |
| 5,943,344 A | * | 8/1999 | Keller et al. | |
| 5,987,333 A | * | 11/1999 | Sole | |
| 5,995,496 A | * | 11/1999 | Honkasalo et al. ......... | 370/318 |

* cited by examiner

*Primary Examiner*—Dang Ton
*Assistant Examiner*—Inder Pal Mehra
(74) *Attorney, Agent, or Firm*—Venable, LLP; Michael A. Sartori

(57) ABSTRACT

A wireless communication apparatus in a wireless communication system transmits power-control information on a power-control channel, separate from the traffic channels of the wireless communication system. In a code division multiple access system, the power-control channel has a separate spreading code. The power-control channel provides a steady flow of power-control information, even when traffic channels are used only intermittently.

12 Claims, 13 Drawing Sheets

WIRELESS COMMUNICATION METHOD AND APPARATUS WITH POWER-CONTROL CHANNEL

BACKGROUND OF THE INVENTION

The present invention relates to wireless communication apparatus useful in a wireless communication system such as a code division multiple access mobile communication system, and to a method of transmitting power-control information in such a system.

Tight control of the transmitting power of mobile stations is an important requirement in code division multiple access (hereinafter, CDMA) communication systems. In conventional CDMA systems, the base station inserts power-control bits into the forward traffic channels, and the mobile stations raise or lower their transmitting power as directed by the power control bits. Typically, a mobile station adjusts its transmitting power many times per second in this way.

CDMA mobile communication systems employing packet communication have been undergoing research and development, however. In packet communication, at some times a base station may transmit packets continuously to a mobile station, but at other times packet transmission is intermittent. If power-control bits are inserted into intermittently transmitted packets, the receiving mobile station can execute power control only intermittently, which is unsatisfactory for system operation. Dummy packets can be transmitted to assure the regular arrival of power-control bits, but such dummy packets waste channel resources.

SUMMARY OF THE INVENTION

It is accordingly an object of the present invention to provide a wireless communication system in which power-control information can be transmitted regularly and often, even during intermittent transmission on traffic channels.

The invented method of transmitting power-control information from a first station to a second station in a wireless communication system establishes a power-control channel, distinct from the traffic channels in the wireless communication system, and transmits power-control information on the power-control channel. The first station may be either a base station or a mobile station. The power-control channel may operate only while another intermittent channel, such as a control channel, is inactive.

Power-control information may also be transmitted on the traffic channels. In this case, power-control information transmitted on the power-control channel is meaningful while the corresponding traffic channel is inactive, and is meaningless when the corresponding traffic channel is active.

If the wireless communication system is a CDMA system, the power-control channel has a different spreading code from the traffic channels.

The power-control information is preferably transmitted in superframes equivalent to two or more frames on the traffic channels.

The power-control channel may also be used to transmit additional information such as paging bits, acknowledgment bits, or flag bits indicating forthcoming transmission on the above-mentioned intermittent channel.

The invented wireless communication apparatus has a transmitting circuit (at the first station) or a receiving circuit (at the second station) for transmitting or receiving a power-control channel as described above.

DETAILED DESCRIPTION OF THE INVENTION

Embodiments of the invention will be described with reference to the attached illustrative drawings. All of the embodiments operate in a mobile CDMA wireless packet communication system. Each base station in the system is able to communicate with up to N mobile stations at once, where N is a fixed number. The base station accordingly has conventional facilities for transmitting packets of user information on a plurality of forward traffic channels, and receiving packets of user information on a plurality of reverse traffic channels, different channels being distinguished by different spreading codes.

Figure 1:
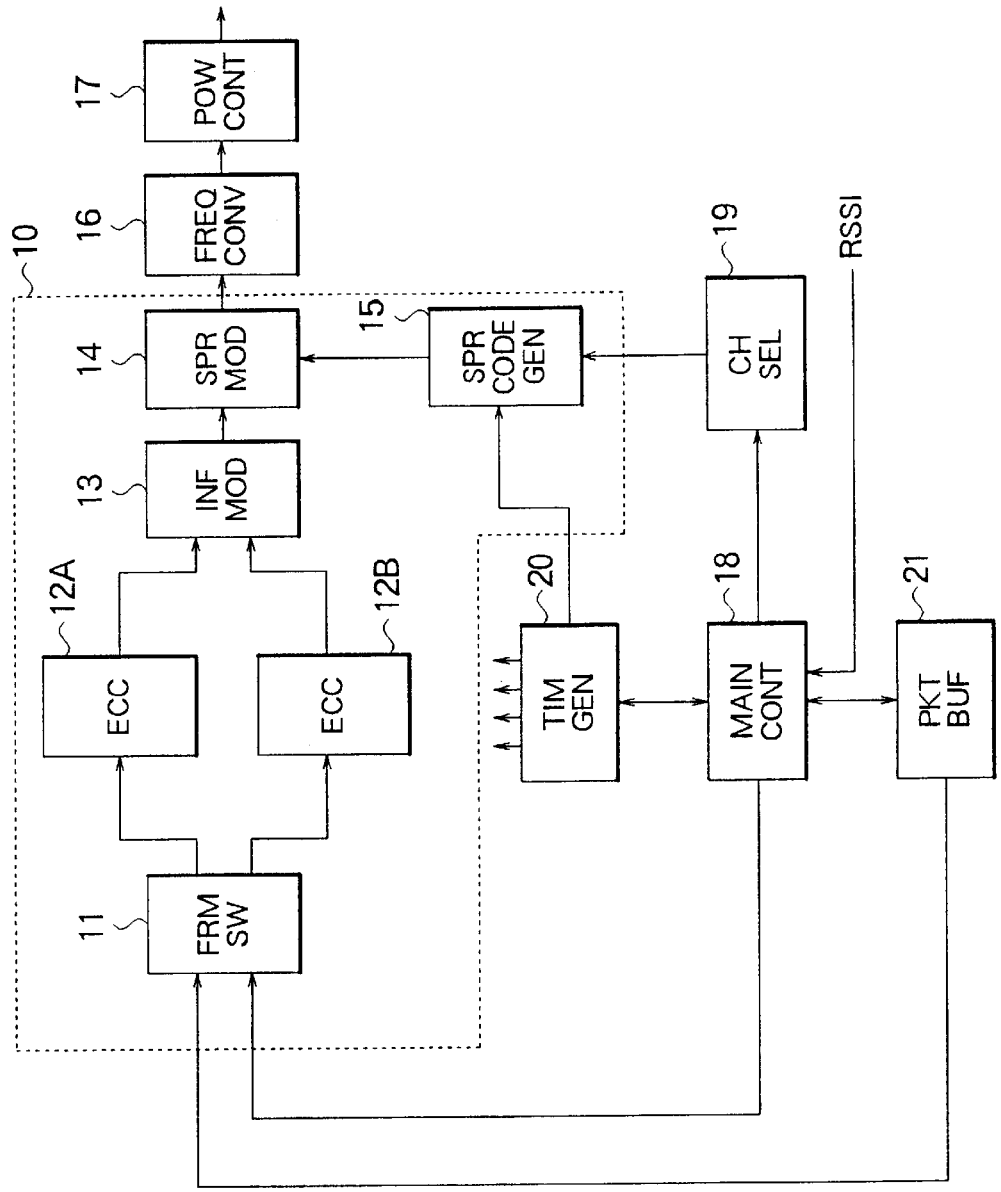
FIG. 1 is a block diagram of transmitting circuits used in a first embodiment of the invention.

Referring to FIG. 1, the base station in the first embodiment also has circuits 10 for transmitting information on control and power-control channels. These circuits 10 include a frame switch (FRM SW) 11, two types of error-correcting coders (ECCs) 12A and 12B, an information modulator (INF MOD) 13, a spreading modulator (SPR MOD) 14, and a spreading-code generator (SPR CODE GEN) 15. Associated circuits include a frequency converter (FREQ CONV) 16, a transmitting power controller (POW CONT) 17, a main controller (MAIN CONT) 18, a channel selector (CH SEL) 19, a timing generator (TIM GEN) 20, and a control-packet buffer (PKT BUF) 21.

The frame switch 11 receives packets of control information addressed to particular mobile stations from the control-packet buffer 21, where the packets are placed by the main controller 18. The frame switch 11 also receives multiplexed power-control information comprising N pairs of power-control bits directly from the main controller 18. The frame switch 11 arranges the control-packet information into frames, sends each frame to the first error-correcting coder 12A, arranges the multiplexed power-control information into superframes, and sends each superframe to the second error-correcting coder 12B.

The first error-correcting coder 12A encodes each received frame of control-packet information, using a comparatively strong error-correcting code such as a convolutional code, and sends the encoded frames to the information modulator 13. The second error-correcting coder 12B encodes each received superframe of multiplexed power-control information, using a weaker error-correcting code such as a Bose-Chaudhuri-Hocquenghem (BCH) code, or a Hamming code, and sends the encoded superframes to the information modulator 13.

A strong error-correcting code is used for the control-packet information because errors in control packets can seriously affect system operations. A weaker error-correcting code is used for the power-control information so that the information can be coded and decoded in fewer processing steps. If convolutional coding were to be employed for the power-control information, for example, power consumption would be significantly increased at both base and mobile stations.

If power consumption must be minimized, the second error-correcting coder 12B can be omitted, the multiplexed power-control information being sent to the information modulator 13 without error-correcting coding.

The information modulator 13 modulates the encoded frames and superframes onto a baseband carrier signal by, for example, binary phase-shift keying (BPSK) or quadrature phase-shift keying (QPSK), and sends the modulated signal to the spreading modulator 14. The spreading modulator 14 carries out a spreading modulation process, using a spreading code such as a pseudorandom noise (PN) code supplied by the spreading-code generator 15, and sends the resulting baseband signal to the frequency converter 16.

The order of information modulation and spreading modulation can be reversed. The spreading modulator 14 can multiply the coded signals output by the error-correcting coders 12A and 12B by the spreading code, and supply the resulting product signals to the information modulator 13.

The spreading-code generator 15 generates two spreading codes, which provide two code channels: a control channel for transmitting control-packet information, and a power-control channel for transmitting the multiplexed power-control information. The spreading-code generator 15 generates the corresponding spreading codes at the direction of the channel selector 19, in synchronization with timing signals supplied from the timing generator 20.

The frequency converter 16 up-converts the signal output by the spreading modulator 14 to a radio-frequency band. The transmitting power controller 17 comprises a power amplifier that amplifies the up-converted signal. The amplified signal is sent through an antenna duplexer (not visible) to a combined transmit-receive antenna (not visible) and radiated into the atmosphere. The radiated signal also includes the forward traffic channels, which are generated and combined with the control and power-control channels by circuits not shown in the drawings.

The main controller 18 controls the overall operation of the base station, and executes call processing. The circuits (not visible) that process signals received from mobile stations on the reverse traffic channels provide the main controller 18 with respective received signal strength indication (RSSI) signals. The main controller 18 also maintains internal information indicating the power level at which each mobile station should be transmitting. From this information and the RSSI signals, the main controller 18 determines whether each mobile station needs to increase or decrease its transmitting power, or maintain the present power level, and generates two power-control bits for each mobile station that give the appropriate instructions. The power-control bits are generated in accordance with Table 1, for example.

TABLE 1

| Power Control Bits | |
| --- | --- |
| Power Control Bits | Meaning |
| 00 | Keep present transmitting power level |
| 01 | Increase transmitting power by 1 step |
| 10 | Decrease transmitting power by 1 step |
| 11 | No meaning |

The main controller 18 stores N pairs of power-control bits internally. The power-control bits for each active mobile station are stored in a location corresponding to the traffic channel identifier assigned to the mobile station during the initial negotiation process that sets up a communication link between the mobile station and the base station. Unassigned traffic channels receive power-control bits with a fixed value such as '00.'

The channel selector 19 switches the operation of the spreading-code generator 15 between generation of the spreading code for the control channel, and generation of the spreading code for the power-control channel.

The timing generator 20 comprises a clock generator, a frame counter, and other well-known circuits that generate timing signals for the spreading-code generator 15 and other components of the base station. For example, the timing generator 20 generates timing signals that indicate the begining of each transmitted frame and superframe.

Figure 2:
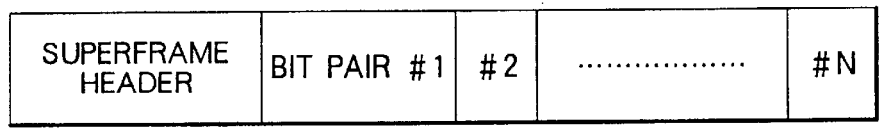
FIG. 2 illustrates a superframe used in the first embodiment.
Figure 3:
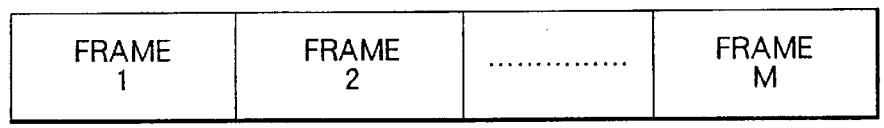
FIG. 3 illustrates a sequence of frames.

FIG. 2 shows the format of a superframe prior to error-correcting encoding. The superframe header, which contains a fixed synchronization pattern, is followed by N pairs of power-control bits. The length of one superframe is equivalent to the length of M frames on a traffic channel, as illustrated in FIG. 3, where M is an integer greater than unity. The length of a control frame is the same as the length of a frame on a traffic channel. The lengths compared in FIGS. 2 and 3 are lengths on the air interface, after error-correcting coding. Frames and superframes are synchronized so that each superframe starts at the same timing as a traffic-channel frame.

During operation, packets of user information arrive at the base station and are placed in a separate user information buffer (not shown in the drawings) for each forward traffic channel. The base station frames these user packets and transmits the framed packets on the traffic channels, inserting power-control bits as in conventional CDMA communication systems. The inserted power-control bits are the pair of power-control bits internally stored by the main controller 18 for the traffic channel on which the frame is transmitted. The base station also transmits control information on the control channel, and multiplexed power-control information on the power-control channel, using a single control channel and a single power-control channel for all mobile stations.

Figure 4:
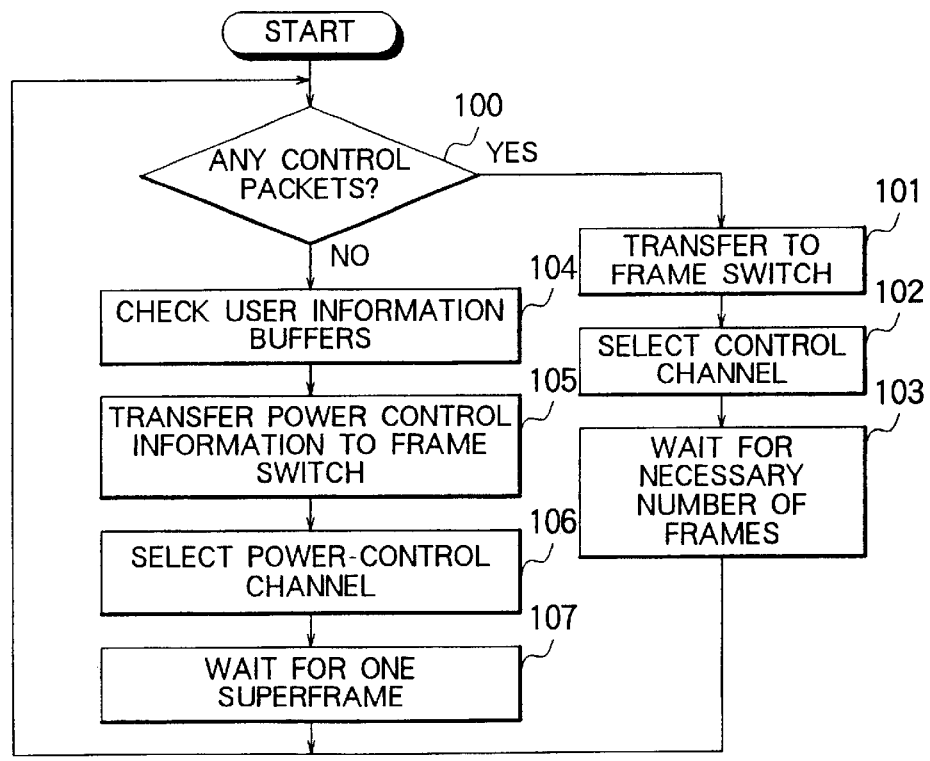
FIG. 4 is a flowchart illustrating the operation of the main controller in FIG. 1.

FIG. 4 illustrates the procedure by which the main controller 18 decides whether to transmit control-packet information or multiplexed power-control information. The main controller 18 repeats this procedure in an endless loop.

The main controller 18 first checks the control-packet buffer 21 to determine whether control-packet information is awaiting transmission (step 100). If so, the main controller 18 transfers the control-packet information from the control-packet buffer 21 to the frame switch 11 (step 101), instructs the channel selector 19 to select the control channel, and instructs the timing generator 20 to send frame timing signals to the spreading-code generator 15 (step 102). After waiting for a time equivalent to the number of frames to be sent (step 103), the main controller 18 returns to the beginning of the procedure (step 100).

When the control-packet buffer 21 is empty, the main controller 18 checks the user information buffer of each forward traffic channel to determine which traffic channels have user information waiting to be transmitted (step 104). The main controller 18 then sets the values of the N pairs of power-control bits in the multiplexed power-control information, which is supplied to the frame switch 11 (step 105). Power-control bits for forward traffic channels with empty user information buffers are set to the meaningful values stored in the main controller 18 ('00,' '01,' or '10'). Power-control bits for channels with user information waiting to be transmitted are set to the meaningless '11' value. The main controller 18 also instructs the channel selector 19 to select the power-control channel, and instructs the timing generator 20 to output timing signals for a superframe (step 106). After waiting for a time equivalent to one superframe (step 107), the main controller 18 returns to the beginning of the procedure.

Ensuing operations proceed as follows. When there is no control-packet information to be transmitted, the frame switch 11 adds a superframe header to the multiplexed power-control information received from the main controller 18, and the second error-correcting coder 12B encodes the resulting superframe, which is converted to a modulated signal by the information modulator 13. As directed by the main controller 18, the channel selector 19 and timing generator 20 cause the spreading-code generator 15 to generate the spreading code of the power-control channel, which the spreading modulator 14 uses to spread the modulated signal output by the information modulator 13. The signal is then up-converted and amplified by the frequency converter 16 and transmitting power controller 17 for transmission from the antenna.

Similarly, when there is control-packet information to be transmitted, it is framed by the frame switch 11, encoded by the first error-correcting coder 12 A, and converted to a modulated signal by the information modulator 13. As directed by the main controller 18, the channel selector 19 and timing generator 20 cause the spreading-code generator 15 to generate the control-channel spreading code, which the spreading modulator 14 uses to spread the modulated signal. This signal is also up-converted and amplified by the frequency converter 16 and transmitting power controller 17 for transmission from the antenna.

Since power-control bits are inserted into traffic-channel frames as well as being transmitted on the power-control channel, the base station may transmit power-control bits to the same mobile station on both a traffic channel and the power-control channel at about the same time. Whenever this occurs, however, the power-control bits on the power-control channel are meaningless ('11'), because the main controller 18 has checked the user information buffer of the traffic channel in advance and learned of the forthcoming transmission on the traffic channel. The mobile station ignores the meaningless '11' power-control bits, so no conflict occurs.

Next, the circuits involved in receiving power-control information and control-packet information at the mobile stations will be described.

Figure 5:
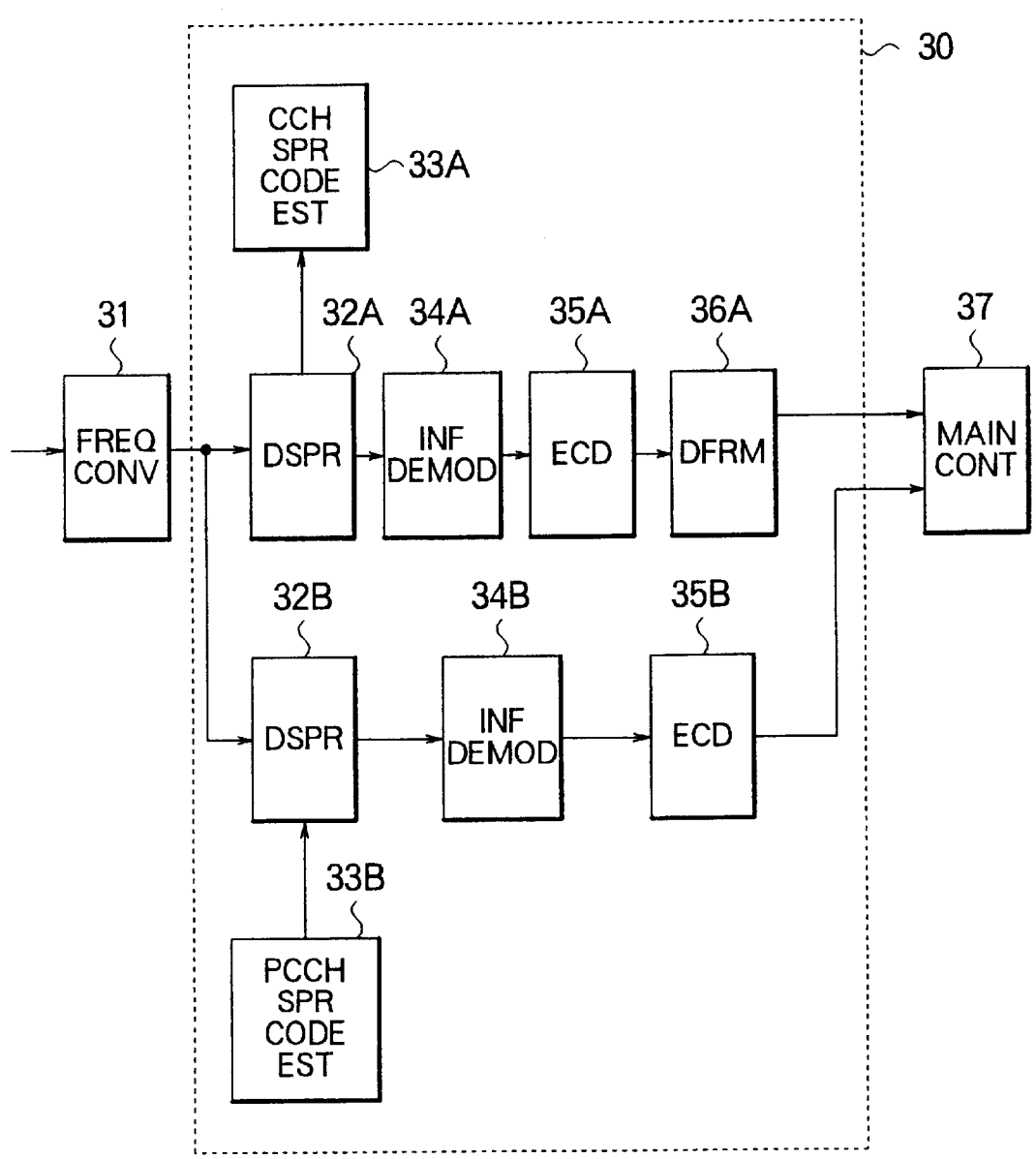
FIG. 5 is a block diagram of receiving circuits used in the first embodiment.

Referring to FIG. 5, these circuits 30 and their associated circuits include a frequency converter 31, a pair of despreaders (DSPRs) 32A and 32B, a control-channel spreading-code estimator (CCH SPR CODE EST) 33A, a power-control channel spreading-code estimator (PCCH SPR CODE EST) 33B, a pair of information demodulators (INF DEMOD) 34A and 34B, a pair of error-correcting decoders (ECDs) 35A and 35B, a deframer (DFRM) 36A, and a main controller 37. The suffix A identifies circuits concerned with the control channel; the suffix B identifies circuits concerned with the power-control channel.

The frequency converter 31 receives a radio-frequency signal from an antenna (not visible) through an antenna duplexer (not visible), down-converts the received signal to the baseband frequency, and provides the resulting baseband signal to the despreaders 32A and 32B.

The first despreader 32A uses the control-channel spreading code, which is supplied from the control-channel spreading-code estimator 33A, to despread the baseband signal, performing a process reverse to the process performed by the spreading modulator 14 in the base station when the control channel is selected by the channel selector 19. The despread signal is sent to the control-channel spreading-code estimator 33 A and information demodulator 34A.

The control-channel spreading-code estimator 33A synchronizes with the control-channel spreading code in the received baseband signal by well-known means, such as a matched filter or sliding correlator, and generates a synchronized control-channel spreading code.

Information demodulator 34A demodulates the output of despreader 32A, performing a function reverse to that of the information modulator 13 in the base station. Error-correcting decoder 35A decodes the resulting signal and thereby corrects errors, the decoding process being inverse to the coding process performed by the first error-correcting coder 12A in the base station. The deframer 36A extracts control-packet information from the decoded frames, reassembles the control packets, and provides the control packets to the main controller 37.

The second despreader 32B uses the spreading code of the power-control channel, which is supplied from the power-control channel spreading-code estimator 33B, to despread the same baseband signal, performing a process reverse to the process performed by the spreading modulator 14 in the base station when the power-control channel is selected by the channel selector 19. The despread signal is provided to the power-control channel spreading-code estimator 33 B and information demodulator 34B. The power-control channel spreading-code estimator 33B, which is similar to the control-channel spreading-code estimator 33A, generates the spreading code of the power-control channel in synchronization with the power-control channel spreading code that appears in the received baseband signal. Information demodulator 34B, which is identical to information demodulator 34A, demodulates the signal despread by despreader 32B. Error-correcting decoder 35B decodes the resulting signal, thus detects and corrects errors, and supplies the decoded multiplexed power-control information to the main controller 37.

Figure 6:
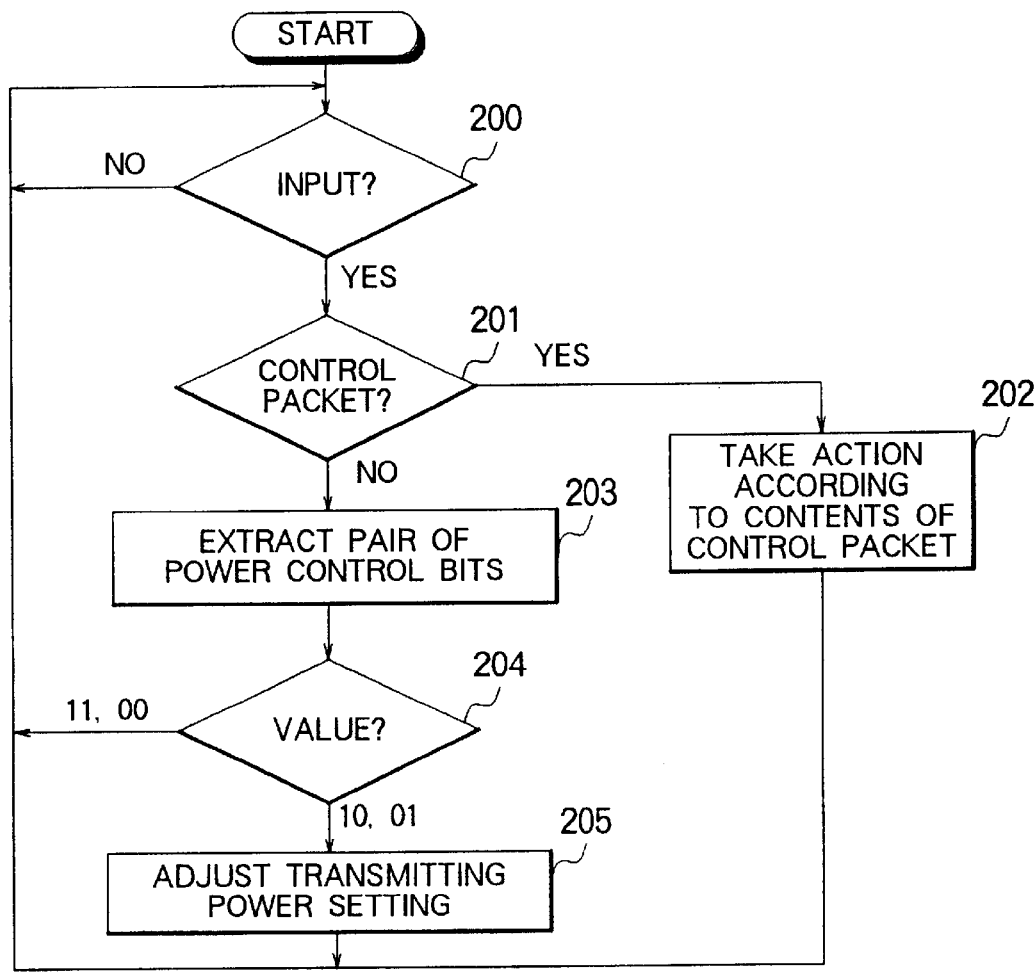
FIG. 6 is a flowchart illustrating the operation of the main controller shown in FIG. 5.

The main controller 37 controls the overall operation of the mobile station, executes call processing, and processes the information received on the control channel and power-control channel by following the procedure shown in FIG. 6.

In this procedure, the main controller 37 waits for input of information from the deframer 36A and the second error-correcting decoder 35B (step 200). Input occurs when the deframer 36 has reassembled a packet, and when the error-correcting decoder 35B has finished decoding a superframe. The main controller 37 identifies the input (step 201) and activates an appropriate service routine.

When a control packet is received, the service routine takes action according to the contents of the packet (step 202), then returns to the beginning of the procedure.

When multiplexed power-control information is received, the service routine extracts the pair of power-control bits that pertain to the mobile station (step 203). The bits are extracted from the fixed position in the superframe corresponding to the mobile station's traffic-channel identifier. Next, the value of the pair of bits is tested (step 204). If the value is '00,' signifying no change in transmitting power, or the meaningless '11' value, the service routine takes no further action and returns to the beginning of the procedure. Otherwise, the service routine adjusts the mobile station's transmitting power by adjusting a power control setting maintained internally by the main controller 37 (step 205). The power is reduced by one step if the control-bit value is '01,' and increased by one step if the value is '10.' The procedure then returns to the beginning to await further input.

When the mobile station receives packets of user information on its forward traffic channel, similar action is taken to adjust the transmitting power control setting according to the power-control bits transmitted on the traffic channel. When the mobile station transmits packets of user information on its reverse traffic channel, the transmitting power is controlled according to the current value of the power control setting.

The mobile station always controls its transmitting power according to the best available power-control information from the base station. During continuous transmission of frames on the forward traffic channel, the receiving mobile station maintains very tight power control by adjusting its transmitting power as often as once per frame. When there is a long lapse between frames, the mobile station still receives power-control bits on the power-control channel, and can adjust its transmitting power level once every M frames (once per superframe), except when the base station suspends operation of the power-control channel in order to transmit control packets on the control channel. The control channel is an intermittent channel that is not heavily used; normally, superframes are transmitted on the power-control channel with sufficient frequency for the mobile stations to maintain satisfactory power control, even when not receiving frames on the forward traffic channels.

As a variation of the first embodiment, the base station can operate the power-control channel continuously, instead of multiplexing the power-control channel with the control channel in the time domain. This variation assures a steady stream of power-control information, regardless of whether control packets are transmitted or not, but requires the base station to have separate framing facilities, information modulators, spreading-code generators, and spreading modulators for the two channels.

As another variation of the first embodiment, substantially the same transmitter and receiver hardware configurations can be used to transmit power-control information on a reverse power-control channel from the mobile stations to the base station. For transmitting this information, each mobile station has the circuits 10 shown in FIG. 1, but generates only one pair of power-control bits per superframe. These bits are supplied to the frame switch 11 with a fixed delay from the reception of a superframe on the forward power-control channel from the base station.

Different mobile stations are assigned different delays, so that their power-control bits do not collide. The spreading-code generator 15 also operates in synchronization with the superframes received from the base station. No superframe header is transmitted on the reverse power-control channel.

The base station receives the reverse power-control channel with circuits similar to those in FIG. 5. The main controller 37 extracts all pairs of power-control bits, and uses the power-control information to adjust the amplitudes of the signals transmitted on the forward traffic channels.

A reverse control channel can be multiplexed with the reverse power-control channel by using the time when no mobile station is transmitting power-control bits. For example, time intervals left open by the non-existent headers on the reverse power-control channel can be used for this purpose, as can time intervals corresponding to control packets transmitted on the forward control channel.

Next, a second embodiment, using a different superframe format, will be described.

Figure 7:
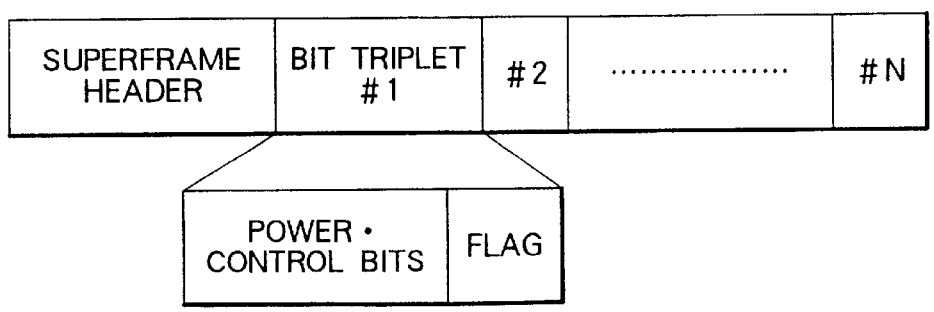
FIG. 7 illustrates a superframe used in a second embodiment of the invention.

Referring to FIG. 7, a superframe in the second embodiment includes a superframe header similar to the header in the first embodiment, followed by three bits for each of the N assignable traffic channels. The first two bits are power-control bits as in the first embodiment. The third bit is a flag bit indicating whether the superframe is followed by a control packet addressed to the mobile station to which the corresponding traffic channel is assigned. For example, the flag bit is set to '1' to indicate a forthcoming control packet, and cleared to '0' when there is no control packet.

Figure 8:
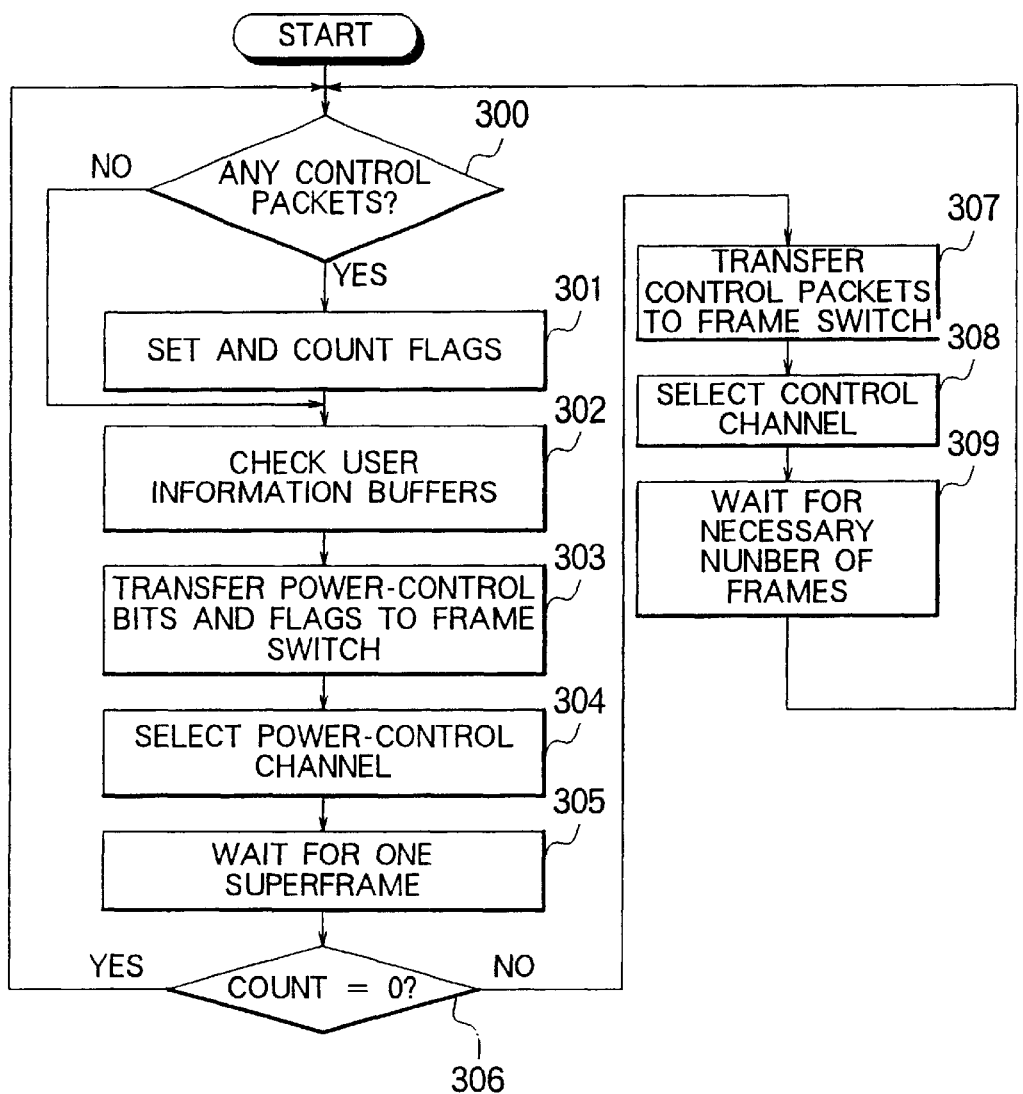
FIG. 8 is a flowchart illustrating the operation of the main controller of the transmitting circuits in the second embodiment.

The base station in the second embodiment has the same hardware configuration as in the first embodiment, illustrated in FIG. 1, but in transmitting power-control bits and control-packet information, the main controller 18 follows the procedure shown in FIG. 8.

As before, the main controller 18 checks for the presence of control-packet information in the control-packet buffer 21 (step 300). Next, the main controller 18 checks the addresses of any control packets present, sets an internally stored flag bit for each mobile station to which a control packet is addressed, and counts the number of flag bits thus set (step 301). If no control packets are present, this step is skipped, the internally stored flags are all cleared to zero, and the count is cleared to zero. The main controller 18 then checks the user information buffer of each forward traffic channel to determine which traffic channels have user information waiting to be transmitted (step 302), and supplies N triplets of bits, each comprising a pair of power-control bits and a flag bit, to the frame switch 11 as multiplexed power-control information (step 303). The power-control bits have the same values as in the first embodiment. The main controller 18 instructs the channel selector 19 to select the power-control channel, and instructs the timing generator 20 to output timing signals for a superframe (step 304). After waiting for a time equivalent to one superframe (step 305), the main controller 18 tests the count of the number of flag bits set (step 306), and returns to the beginning of the procedure if the count is zero.

If the count is not zero, the main controller 18 proceeds to transfer control-packet information from the control-packet buffer 21 to the frame switch 11, transferring at most one control packet per mobile station (step 307). The main controller 18 then instructs the channel selector 19 to select the control channel, and instructs the timing generator 20 to send frame timing signals to the spreading-code generator 15 (step 308). After waiting for a time equivalent to the number of frames to be sent, as determined from the count of flag bits (step 309), the main controller 18 returns to the beginning of the procedure (step 300).

The second error-correcting coder 12B in the second embodiment employs an error-correcting code such as a Hamming code that simply adds error-correcting code bits to the end of each superframe, without altering the bit values within the superframe.

Figure 9A:
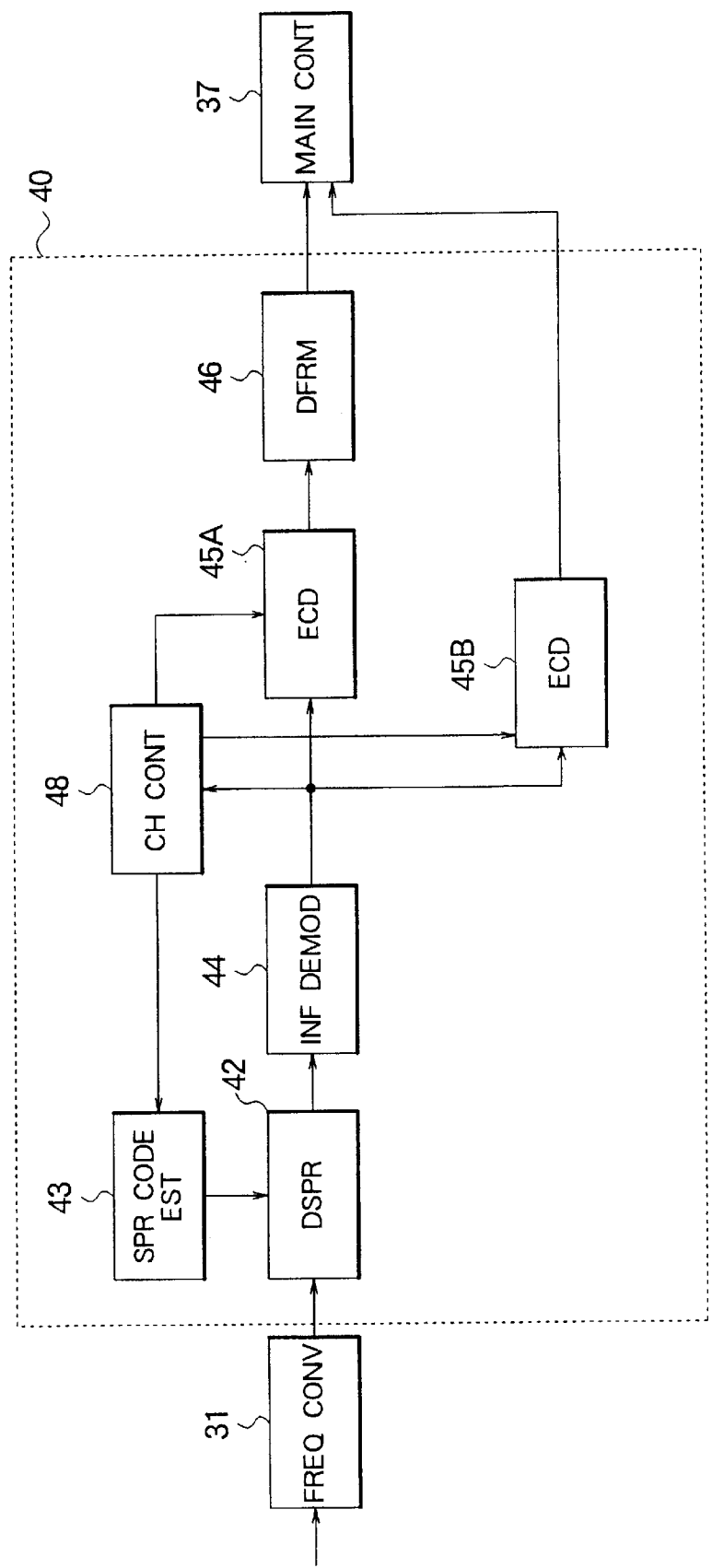
FIG. 9A is a block diagram showing receiving circuits used in the second embodiment.

Referring to FIG. 9A, the circuits 40 that receive control-packet information and power-control bits at the mobile stations in the second embodiment are simplified, comprising a single despreader 42, a single spreading-code estimator 43, a single information demodulator 44, error-correcting decoders 45A and 45B, a deframer 46, and a channel controller (CH CONT) 48. As in the first embodiment, these circuits 40 receive a baseband signal from a frequency converter 31 and supply deframed and decoded information to a main controller 37.

The despreader 42 despreads the baseband signal by using a spreading code supplied from the spreading-code estimator 43. The despread signal is demodulated by the information demodulator 44, and supplied to the error-correcting decoders 45A and 45B and channel controller 48.

The channel controller 48 scans the demodulated signal, detects the superframe header, reads the flag bits shown in FIG. 7, and instructs the spreading-code estimator 43 whether to generate the spreading code of the power-control channel or the spreading code of the control channel. Normally, the channel controller 48 selects the spreading code of the power-control channel, but after counting the flag bits set in each superframe, if the count is not zero, the channel controller 48 directs the spreading-code estimator 43 to generate the control-channel spreading code for the number of frames of control-packet information that follow the superframe, as determined from the count.

The channel controller 48 also controls the error-correcting decoders 45A and 45B, so that only one decoder is active at a time. During the reception of multiplexed power-control information, the second error-correcting decoder 45B decodes the demodulated signal, detects and corrects errors, and sends the corrected signal to the main controller 37. During the reception of control-packet information, the first error-correcting decoder 45A decodes the demodulated signal, correcting errors, and the deframer 46 reassembles the control packets, which are supplied to the main controller 37. The main controller 37 performs the same operations as in the first embodiment.

Figure 9B:
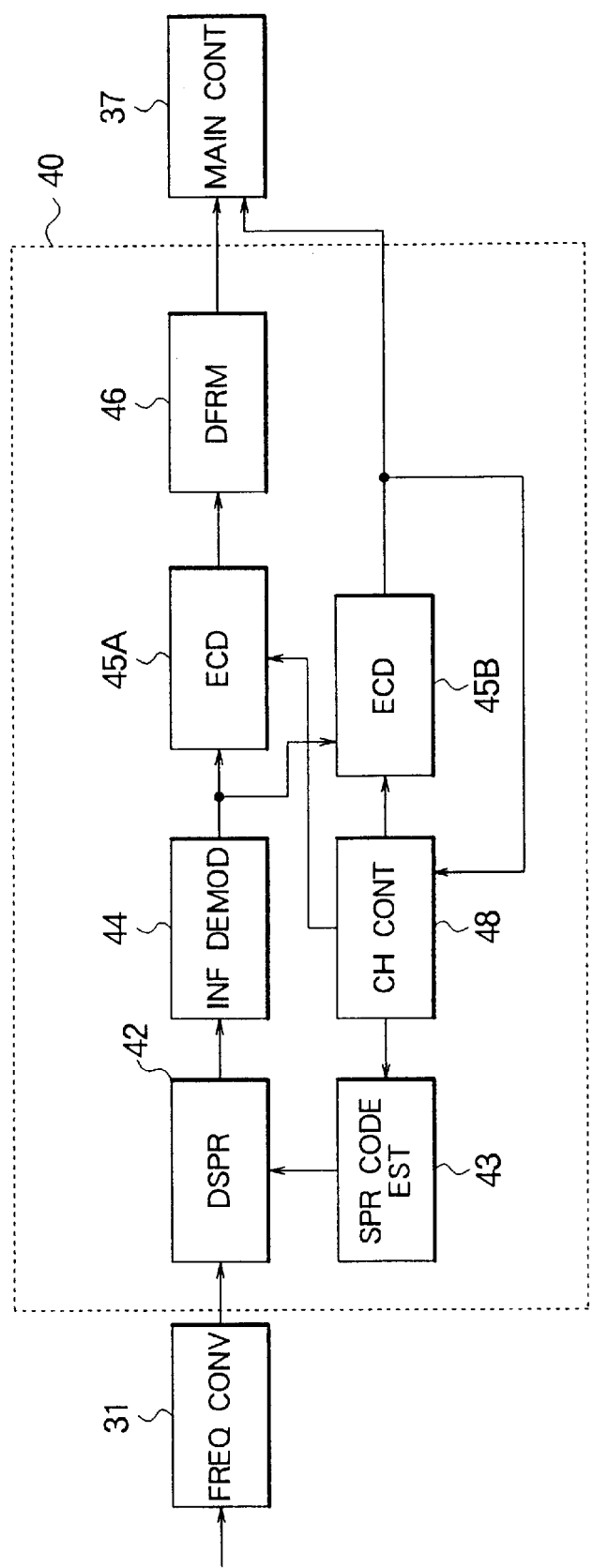
FIG. 9B is a block diagram showing a variation of the receiving circuits in FIG. 9A.

FIG. 9B illustrates a variation of the second embodiment in which the channel controller 48 receives the multiplexed power-control information after decoding by the second error-correcting decoder 45B. This variation has the advantage of being able to correct bit errors in the flag bits before the channel controller 48 uses the flag bits to decide between reception of the control channel and reception of the power-control channel. This variation also allows the second error-correcting coder 12B at the base station to use a stronger error-correcting code.

Figure 9C:
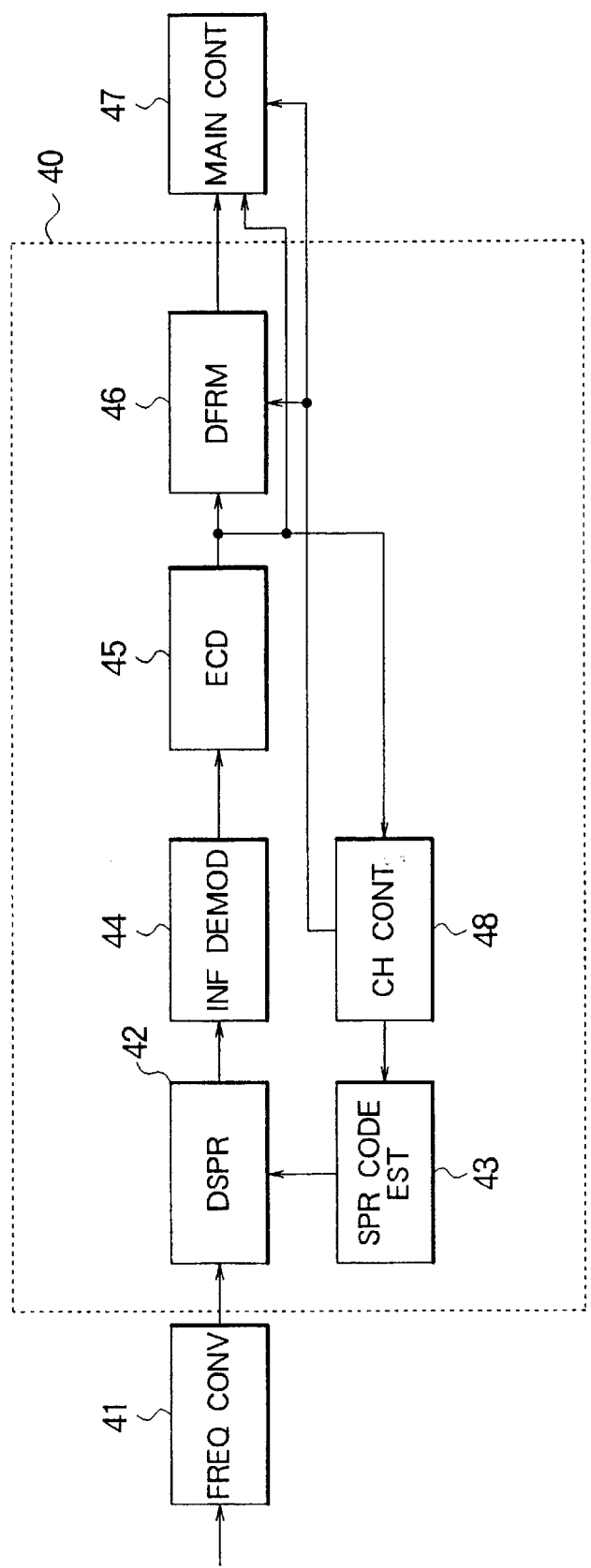
FIG. 9C is a block diagram showing another variation of the receiving circuits in FIG. 9A.

FIG. 9C illustrates a further variation of the second embodiment, in which the second error-correcting coder 12B at the base station uses the same strong error-correcting code as the first error-correcting coder 12A. At the mobile station, the demodulated signal is decoded by a single decoder 45, the output of which is supplied to the deframer 46, main controller 37, and channel controller 48. Besides controlling the spreading-code estimator 43, the channel controller 48 outputs a signal that enables and disables the deframer 46, and instructs the main controller 37 whether to accept input from the decoder 45 or the deframer 46. This variation consumes additional power in the decoding process, but reduces the probability of loss of control-packet information due to the input of incorrect flag bits to the channel controller 48.

The second embodiment can also be used for transmitting power-control bits and flag bits on a reverse power-control channel from the mobile stations to the base station, synchronized with the forward power-control channel as explained in the first embodiment. The flag bits on the reverse power-control channel can be advantageously used to acknowledge the reception of control packets on the forward control channel from the base station.

The second embodiment provides substantially the same effects as the first embodiment, but simplifies the configuration of the circuits that receive the control channel and power-control channel.

Next, a third embodiment will be described. The third embodiment uses multiple spreading on the control channel and power-control channel.

Figure 10:
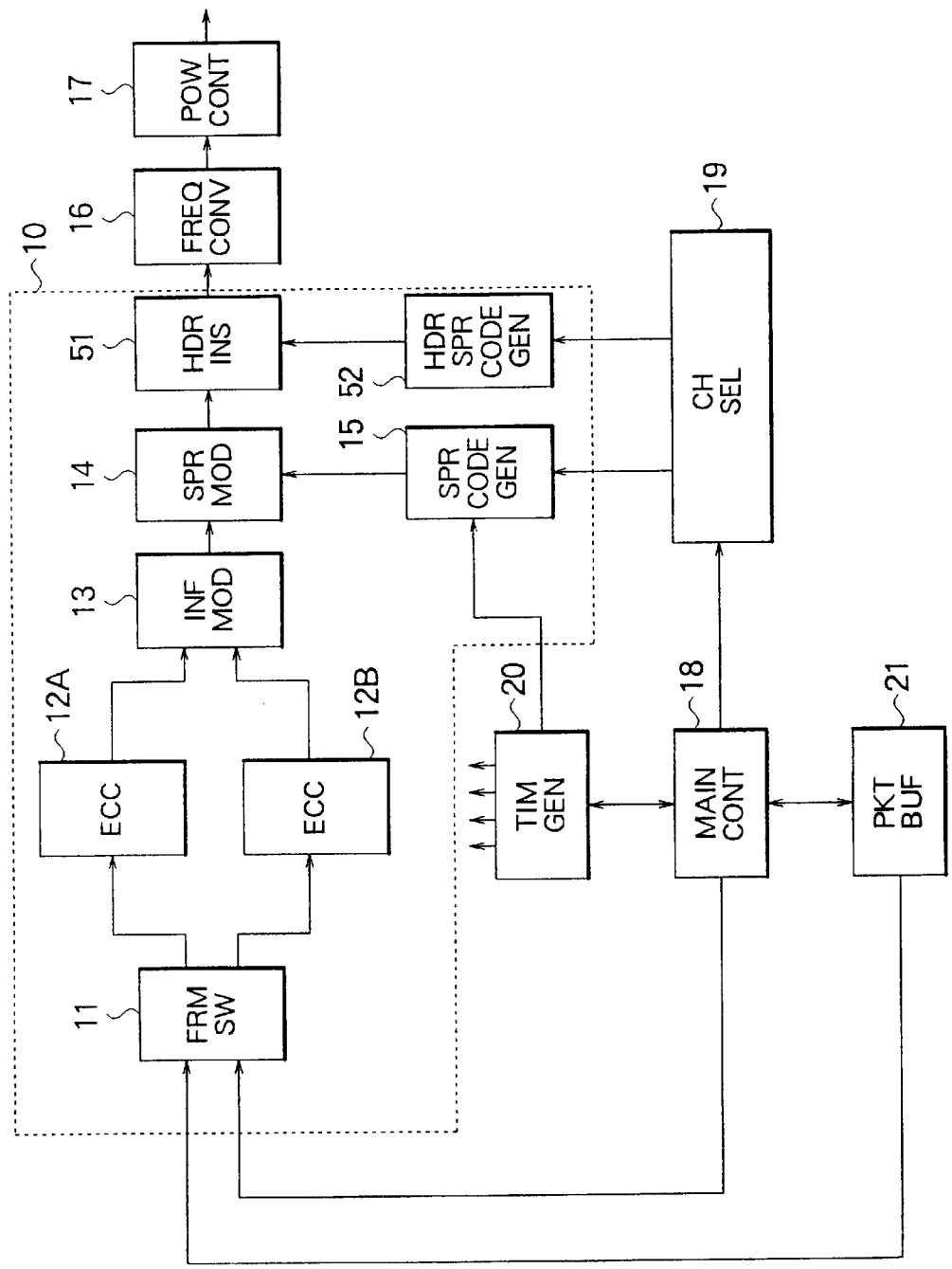
FIG. 10 is a block diagram of transmitting circuits used in a third embodiment of the invention.

FIG. 10 illustrates the base-station circuits 10 that transmit the control channel and power-control channel, using the same reference numerals as in FIG. 1 for similar elements. Descriptions of these elements will be omitted insofar as these elements are the same as in the first embodiment.

In the third embodiment, the frame switch 11 does not add headers to frames and superframes. Instead, a header inserter (HDR INS) 51 is disposed between the spreading modulator 14 and frequency converter 16. A header spreading-code generator (HDR SPR CODE GEN) 52, controlled by the channel selector 19 and receiving timing signals from the timing generator 20, generates header spreading codes and supplies the header spreading codes to the header inserter 51. During the header interval at the beginning of each superframe, the header spreading-code generator 52 generates and supplies the superframe-header spreading code. During the header interval at the beginning of each ordinary frame, the header spreading-code generator 52 generates and supplies an ordinary header spreading code. The header inserter 51 spreads the superframe header pattern or frame header pattern by the supplied spreading code, adds the resulting signal to the signal received from the spreading modulator 14, and sends the combined signal to the frequency converter 16.

Figure 11:
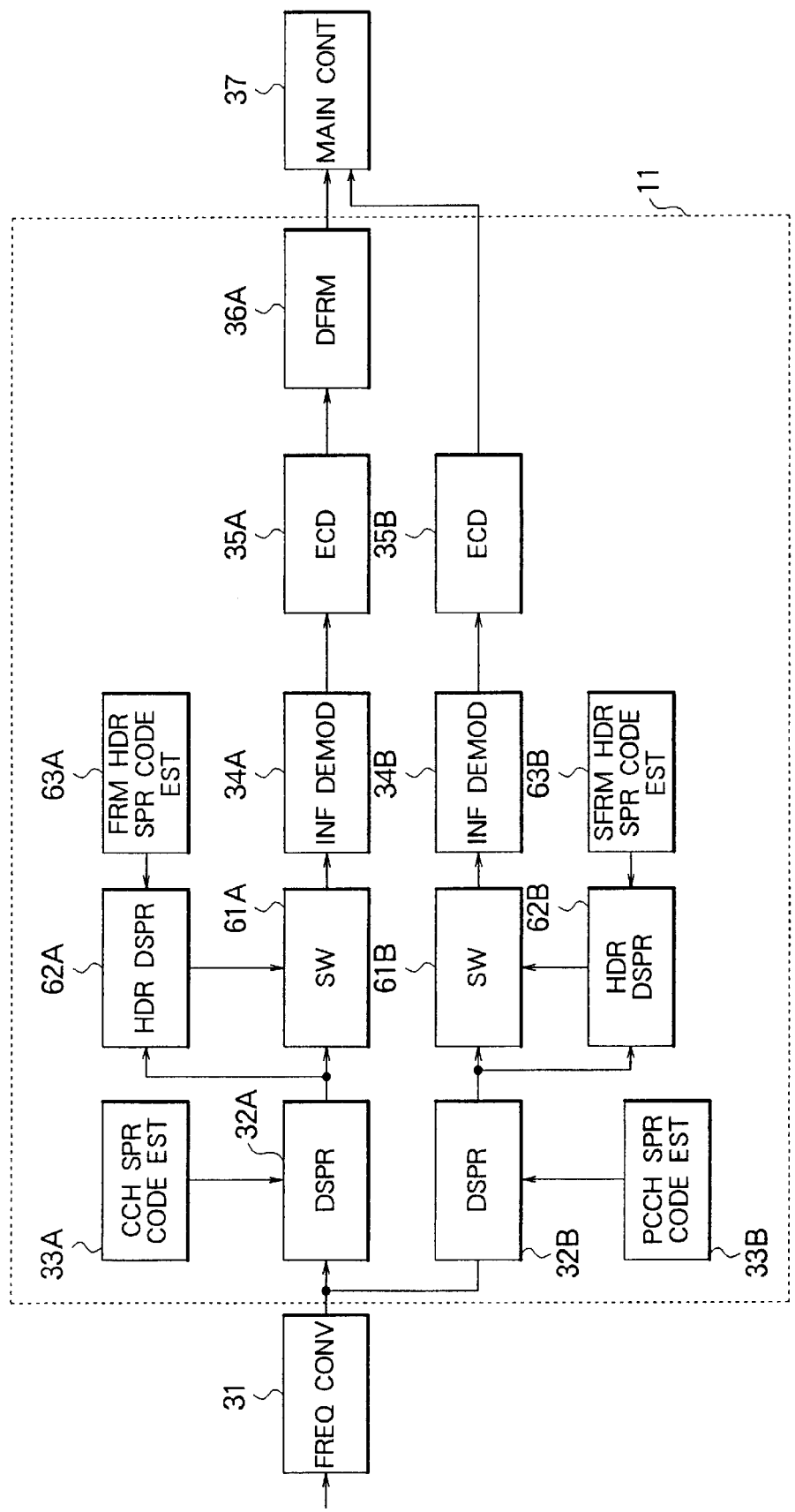
FIG. 11 is a block diagram of receiving circuits used in a third embodiment.

FIG. 11 illustrates the mobile-station circuits 30 that receive the control channel and power-control channel, using the same reference numerals as in FIG. 5 for similar elements, descriptions of which will be omitted. The new elements are a pair of switches (SWs) 61A and 61B, a pair of header despreaders (HDR DSPRs) 62A and 62B, a frame-header spreading-code estimator (FRM HDR SPR CODE EST) 63A, and a superframe-header spreading-code estimator (SFRM HDR SPR CODE EST) 63B.

The despread signal output by despreader 32A is supplied to switch 61A and header despreader 62A. This signal has been despread with respect to the control-channel spreading code, but the frame headers in the signal are still spread by the frame-header spreading code. The header despreader 62A receives a synchronized frame-header spreading code from the frame-header spreading-code estimator 63A, which estimates the timing of the frame-header spreading code in the output of despreader 32A by use of a matched filter or sliding correlator, for example. Header despreader 62A uses this synchronized frame-header spreading code to recognize each frame header in the signal output by despreader 32A, and generates a control signal that opens switch 61A during frame header intervals, so that the output of despreader 32A is not received by information demodulator 34A during the header intervals.

Similarly, the superframe-header spreading-code estimator 63B uses a matched filter or sliding correlator, for example, to generate a synchronized superframe-header spreading code, by which header despreader 62B recognizes superframe headers in the despread signal output by despreader 32B. Header despreader 62B generates a control signal that opens switch 61B to remove the superframe headers from the signals reaching information demodulator 34B.

Compared with the preceding embodiments, the third embodiment recognizes frame headers and superframe headers more quickly and more accurately, and by removing the headers from the received signal, avoids unnecessary operation of the information demodulators and error-correcting decoders during header intervals.

Next, a fourth embodiment will be described. The fourth embodiment has the same hardware configuration as the first embodiment, shown in FIGS. 1 and 5.

Figure 12:
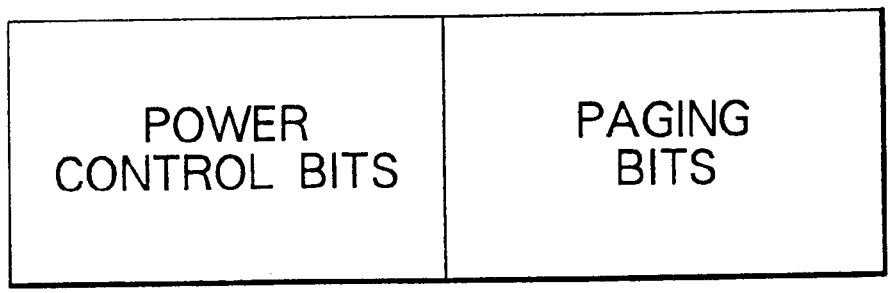
FIG. 12 illustrates a superframe used in a fourth embodiment of the invention.

Referring to FIG. 12, a superframe in the fourth embodiment comprises both power-control bits, as described in the first embodiment, and paging bits. The paging bits notify mobile stations of arriving calls. The power-control channel thus also functions as a paging channel. The superframe header in FIG. 12 has been omitted for simplicity.

Figure 13:
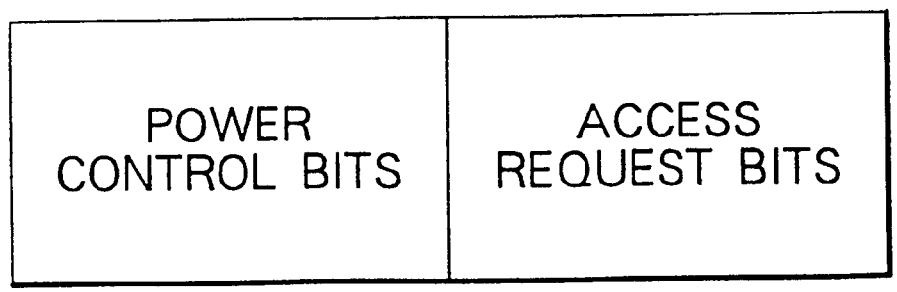
FIG. 13 illustrates another superframe used in the fourth embodiment.

Similarly, in systems in which the mobile stations transmit power-control bits to the base station, a superframe on the reverse power-control channel comprises both power-control bits and access request bits, as shown in FIG. 13. The mobile stations use the access request bits when originating calls. The reverse power-control channel thus also functions as an access channel.

The fourth embodiment provides the same effects as the first embodiment, while conserving channel resources by using a single channel for two functions.

In the preceding embodiments, the power-control channel and control channel were multiplexed in the time domain, so that only one of the two channels was active at a time. If this arrangement is inconvenient, the power-control channel can be multiplexed in the time domain with a code channel other than the control channel. For example, if there is a code channel that is less active than the control channel, the power-control channel can be multiplexed with this less active channel.

When the power-control channel is multiplexed with another code channel in the time domain, the two channels do not need to share transmitter hardware components to the extent shown in FIGS. 1 and 10. The shared components can be limited to the radio-frequency components, for example.

Figure 14:
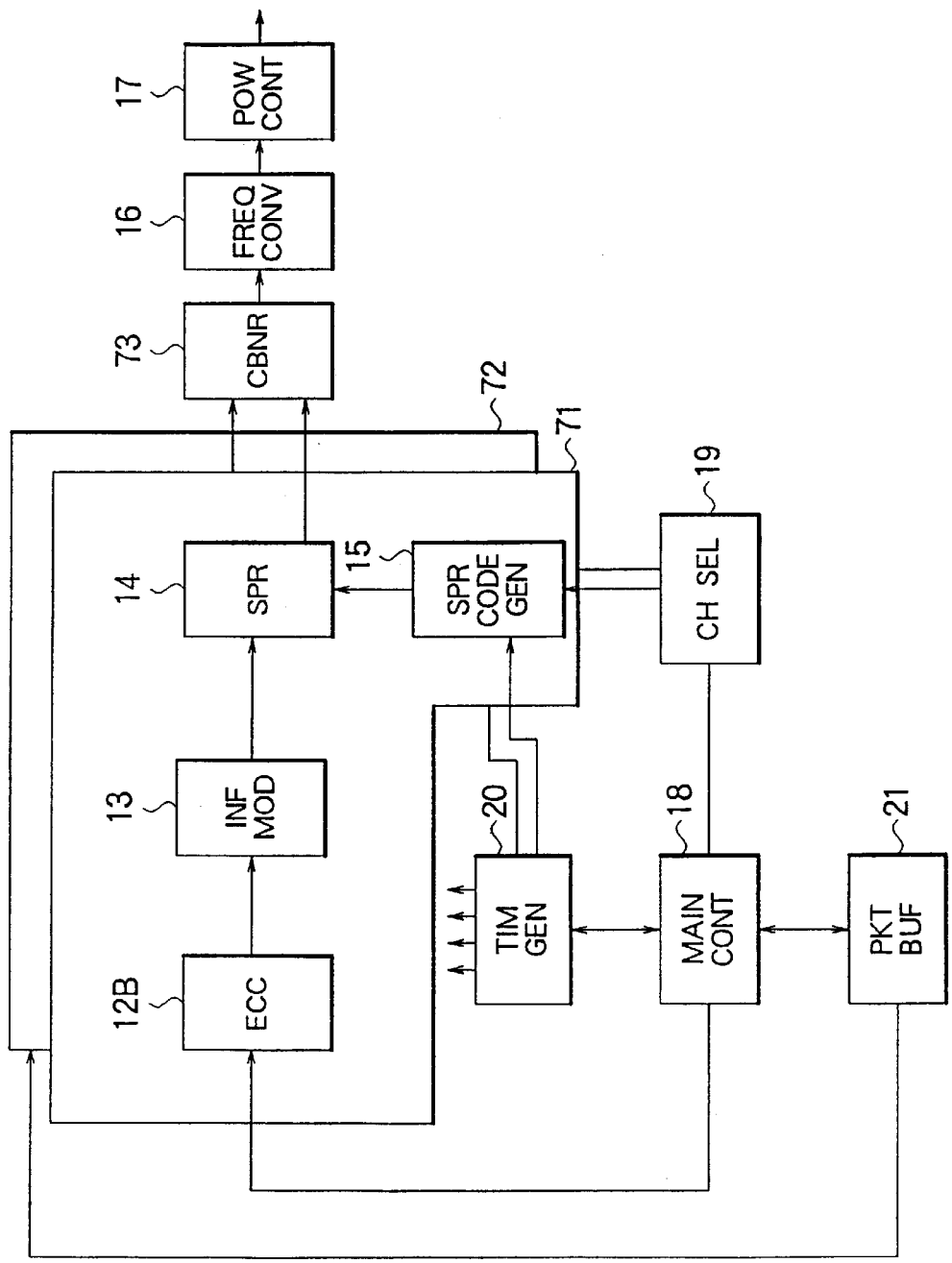
FIG. 14 illustrates a variation of the transmitting circuits in the first embodiment.

FIG. 14 shows base-station transmitter circuits of this type, comprising a first baseband processing section 71 for the power-control channel, a second baseband processing section 72 for the control channel or another intermittent channel, and a combiner (CBNR) 73 that combines the signals output by the two baseband processing sections and supplies the combined signal to the frequency converter 16. The spreading-code generator 15 in the first baseband processing section 71 generates only the spreading code of the power-control channel. A similar spreading code generator (not visible) in the second baseband processing section 72 generates the spreading code of the control channel or other intermittent channel. Both spreading code generators receive control signals and timing signals from the channel selector 19 and timing generator 20. The other elements in FIG. 14 are as described in the first embodiment.

Figure 15:
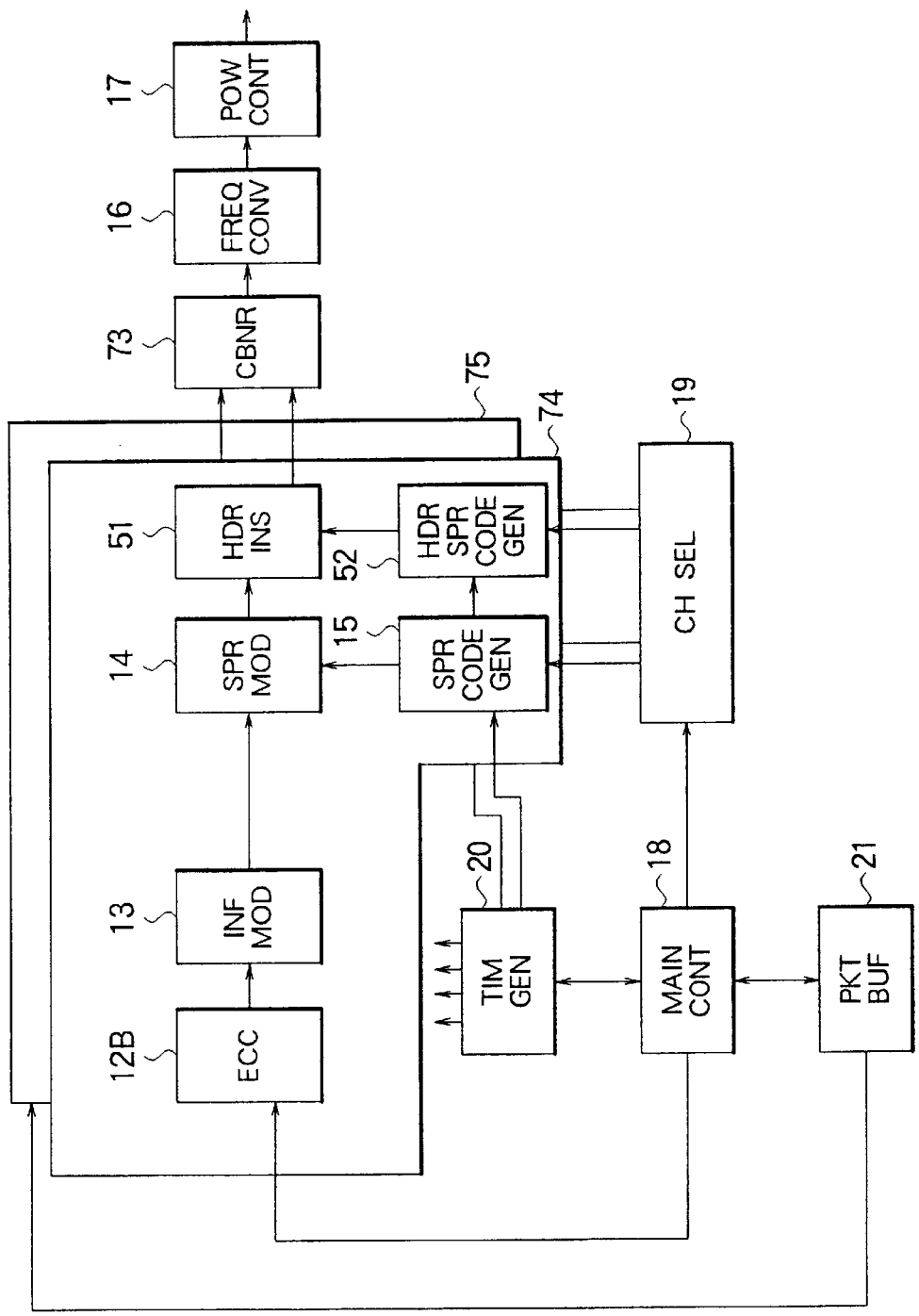
FIG. 15 illustrates a variation of the transmitting circuits in the third embodiment.

FIG. 15 shows similar transmitter circuits based on the third embodiment. The first baseband processing section 74 now includes a header inserter 51 and header spreading-code generator 52, which attach a superframe header to each superframe. The second baseband processing section 75 includes a similar header inserter and header spreading-code generator (not visible) that attach frame headers to ordinary frames.

These alterations of the transmitter hardware configuration do not require any alterations in the receiver. The receiving circuits shown in FIGS. 5 and 11 can still be used.

Although the invention has been described in relation to a CDMA system, the basic concept of providing a separate power-control channel can be applied in other multiple-access systems, including time-division multiple access (TDMA) and frequency-division multiple access (FDMA) systems.

The information transmitted on the power-control channel is not limited to bits instructing a station to raise or lower its transmitting power. A specific desired power value can be transmitted directly, for example.

Those skilled in the art will recognize that further variations are possible within the scope claimed below.

What is claimed is:

1. A method of transmitting power-control information from a first station to a second station in a wireless communication system, said first station also transmitting user information to said second station on a traffic channel, comprising the steps of:

establishing a power-control channel independent from said traffic channel;

transmitting said power-control information on said power-control channel;

establishing an intermittent channel distinct from both said power-control channel and said traffic channel;

transmitting flag bits on said power-control channel to indicate forthcoming transmission of said power-control information on said intermittent channel from said first station to said second station; and switching from reception of said power-control channel at said second station to reception of said intermittent channel at said second station, responsive to said flag bits.

2. A method of transmitting power-control information from a first station to a second station in a code division multiple access wireless communication system, said first station also transmitting user information intermittently to said second station on a traffic channel, the code division multiple access wireless communication system having an air interface in which the user information transmitted on the traffic channel is divided into frames, comprising the steps of:

establishing a power-control channel independent from said traffic channel;

transmitting said power-control information on said power-control channel;

dividing the power-control information transmitted on said power-control channel into superframes equal in length to M of the frames on said traffic channel, M being an integer greater than one;

adding a header to each superframe of power-control information transmitted on said power-control channel;

spreading said power-control information by a first spreading code; and spreading said header by a second spreading code different from said first spreading code.

3. A wireless communication apparatus transmitting user information to a distant station on a traffic channel in a code division multiple access wireless communication system, and receiving information transmitted from said distant station, comprising:

a main controller generating power-control information for controlling transmitting power at said distant station; and a transmitting circuit coupled to said main controller, transmitting said power-control information to said distant station on a power-control channel distinct from said traffic channel, transmitting control packets intermittently to said distant station on a control channel, distinct from both said traffic channel and said power-control channel, and discontinuing transmission on said power-control channel while transmitting on said control channel, the transmitting circuit including:

a frame switch receiving said control packets from said main controller, and in absence of said control packets, receiving said power-control information from said main controller;

an information modulator modulating said control packets and said power-control information onto a baseband signal;

a spreading-code generator generating a first spreading code for said power-control channel and a second spreading code for said intermittent channel, as directed by said main controller; and a spreading modulator using the spreading code generated by said spreading-code generator to spread saidbaseband signal.

4. The wireless communication apparatus of claim 3, wherein said transmitting circuit further comprises:

a first error-correcting coder coding said control packets with a first error-correcting code; and a second error-correcting coder coding said power-control information with a second error-correcting code weaker than said first error-correcting code.

5. A wireless communication apparatus transmitting user information to a distant station on a traffic channel in a wireless communication system, and receiving information transmitted from said distant station, comprising:

a main controller generating power-control information for controlling transmitting power at said distant station; and a transmitting circuit coupled to said main controller, transmitting said power-control information to said distant station on a power-control channel distinct from said traffic channel, transmitting information to said distant station on an intermittent channel, distinct from both said traffic channel and said power-control channel, and discontinuing transmission on said power-control channel while transmitting on said intermittent channel;

wherein said main controller also generates flag bits indicating forthcoming transmission of information on said intermittent channel, and said transmitting circuit transmits said flag bits on said power-control channel.

6. A wireless communication apparatus transmitting user information to a distant station on a traffic channel in a code division multiple access wireless communication system having an air interface in which the user information transmitted on said traffic channel is divided into frames, and receiving information transmitted from said distant station, comprising:

a main controller generating power-control information for controlling transmitting power at said distant station; and a transmitting circuit coupled to said main controller, transmitting said power-control information to said distant station on a power-control channel distinct from said traffic channel;

wherein said transmitting circuit divides the power-control information transmitted on said power-control channel-into superframes equal in length to M of the frames on said traffic channel, M being an integer greater than one;

said transmitting circuit adds a header to each superframe of power-control information transmitted on said power-control channel; and said transmitting circuit includes a spreading-code generator generating a first spreading code;

a spreading modulator spreading said power-control information by said first spreading code;

a header spreading-code generator generating a second spreading code different from said first spreading code; and a header inserter spreading said header by said second spreading code.

7. A wireless communication apparatus receiving user information from a distant station on a traffic channel in a code division multiple access wireless communication system, and transmitting information to said distant station with a controllable transmitting power, comprising:

a receiving circuit receiving power-control information from said distant station on a power-control channel distinct from said traffic channel, and receiving information from said distant station on an intermittent channel distinct from both said traffic channel and said power-control channel;

a main controller coupled to said receiving circuit, controlling the transmitting power of said wireless communication apparatus according to said power-control information; and a frequency converter for converting a radio-frequency signal received from said distant station, including said traffic channel, said power-control channel, and said intermittent channel, to a baseband signal.

8. The wireless communication apparatus of claim 7, wherein said receiving circuit comprises:

a first spreading-code estimator generating a first spreading code for said intermittent channel;

a first despreader using said first spreading code to despread said baseband signal;

a second spreading-code estimator generating a second spreading code for said power-control channel; and a second despreader using said second spreading code to despread said baseband signal.

9. The wireless communication apparatus of claim 7, wherein said receiving circuit comprises:

a spreading-code estimator generating a first spreading code for said intermittent channel and a second spreading code for said power-control channel;

a channel controller causing said spreading-code estimator to output a selected one of said first spreading code and said second spreading code; and a despreader using the spreading code output by said spreading-code estimator to despread said baseband signal.

10. The wireless communication apparatus of claim 9, wherein said channel controller controls said spreading-code estimator according to flag bits received on said power-control channel, indicating forthcoming transmission of information on said intermittent channel.

11. A wireless communication apparatus receiving user information from a distant station on a traffic channel in a code division multiple access wireless communication system, and transmitting information to said distant station with a controllable transmitting power, comprising:

a receiving circuit receiving power-control information from said distant station on a power-control channel distinct from said traffic channel; and a main controller coupled to said receiving circuit, controlling the transmitting power of said wireless communication apparatus according to said power-control information;

wherein said wireless communication system has an air interface in which the user information transmitted on said traffic channel is divided into frames;

said wireless communication apparatus receives the power-control information transmitted on said power-control channel in superframes equal in length to M of the frames on said traffic channel, M being an integer greater than one;

each of said superframes has a header; and said receiving circuit includes a first spreading-code estimator generating a first spreading code for said power-control information;

a first despreader despreading said power-control information by said first spreading code, obtaining a baseband signal;

a second spreading-code estimator generating a second spreading code, different from said first spreading code, for said header;

a header despreader using said second spreading code to recognize said header in said baseband signal; and a switch removing said header from said baseband signal.

12. The wireless communication apparatus of claim 4, wherein the information transmitted on said intermittent channel comprises control packets.

\* \* \* \* \*